Dec. 31, 1963 F. G. UTTLEY 3,116,085
TELESCOPIC TRAILER
Filed June 22, 1962 3 Sheets-Sheet 1
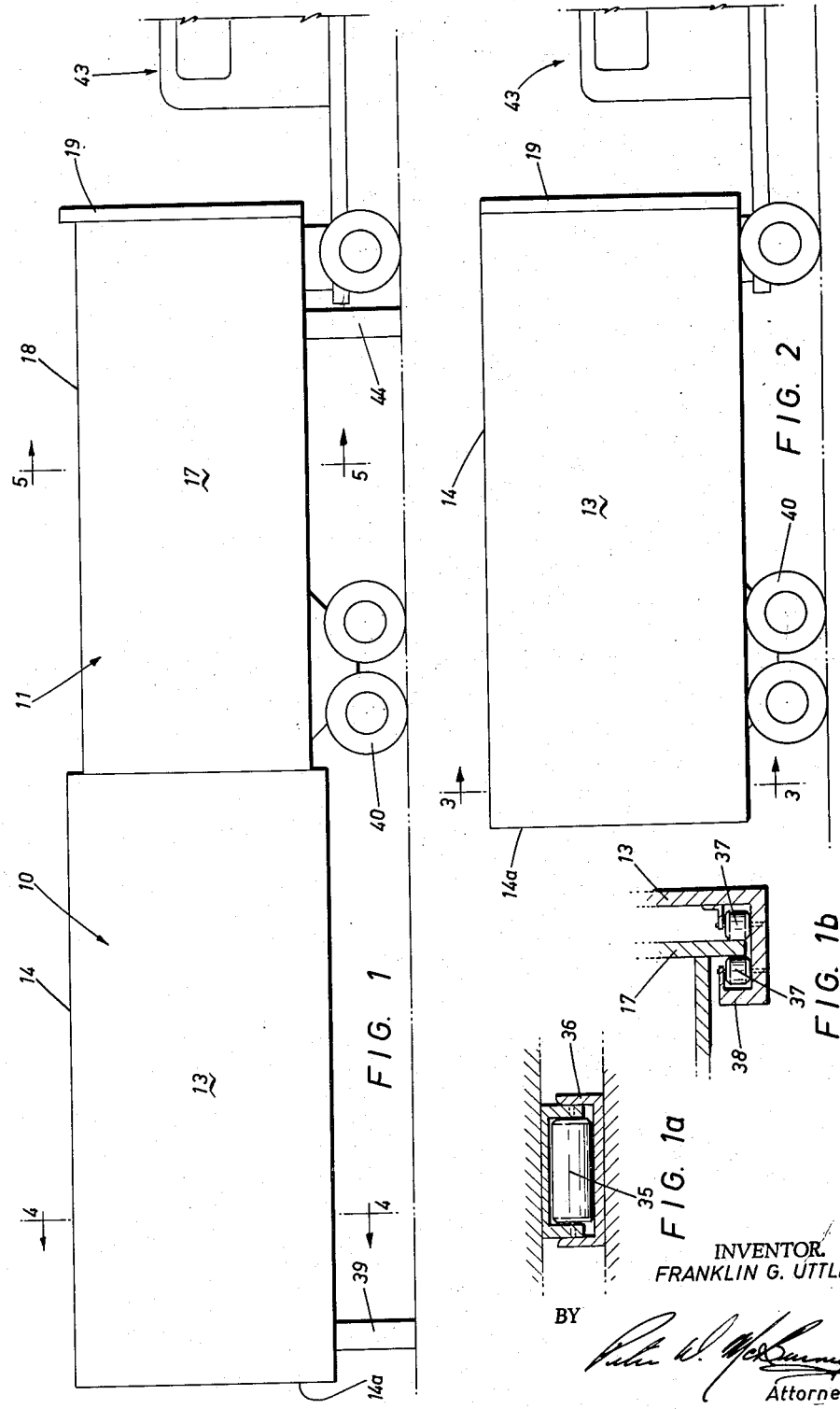
INVENTOR.
FRANKLIN G. UTTLEY
BY
Attorney Dec. 31, 1963     F. G. UTTLEY     3,116,085
TELESCOPIC TRAILER Filed June 22, 1962     3 Sheets-Sheet 2

INVENTOR.
FRANKLIN G. UTTLEY

BY

*Attorney*

Dec. 31, 1963   F. G. UTTLEY   3,116,085
TELESCOPIC TRAILER
Filed June 22, 1962   3 Sheets-Sheet 3
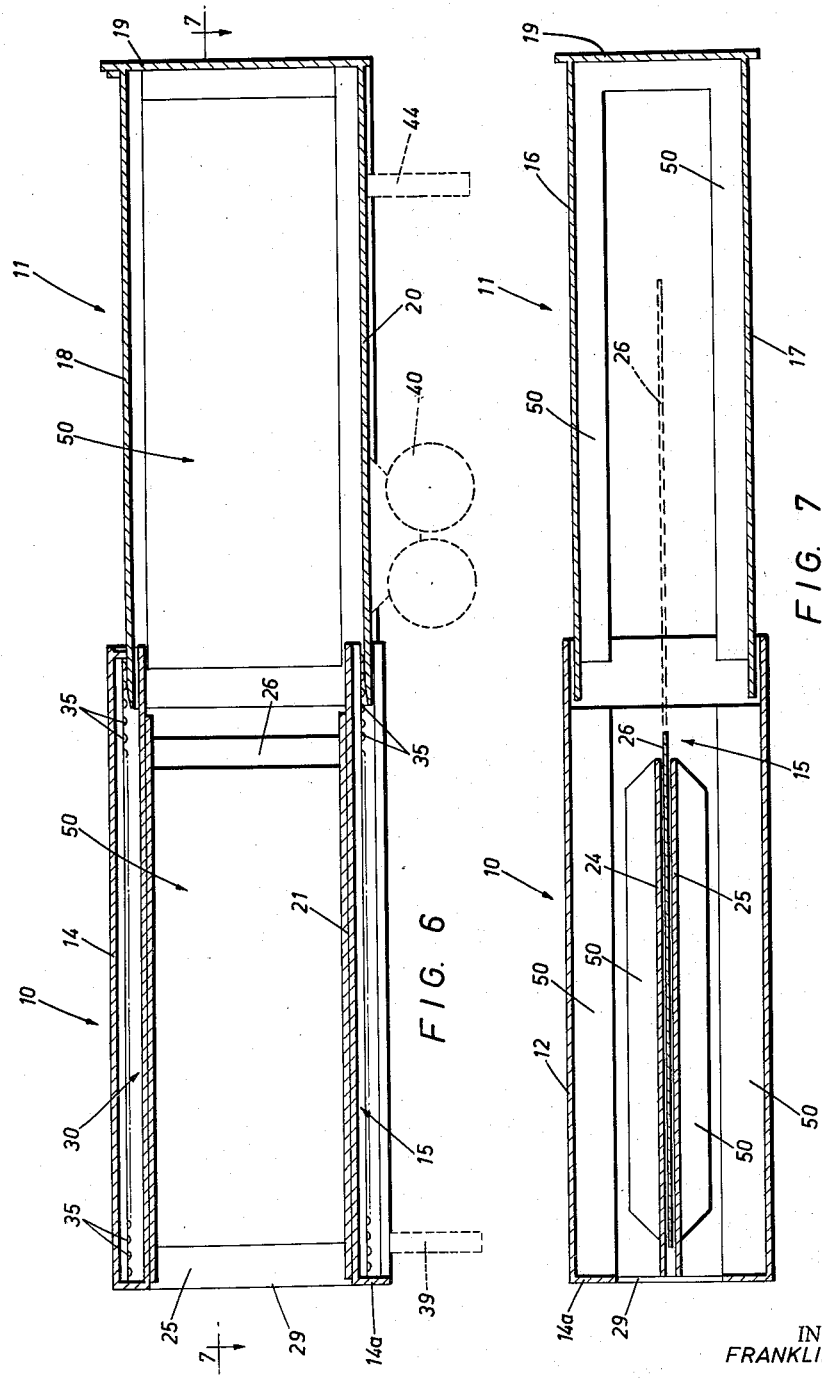
INVENTOR.
FRANKLIN G. UTTLEY
BY
Attorney

United States Patent Office 3,116,085
Patented Dec. 31, 1963

3,116,085
TELESCOPIC TRAILER
Franklin George Uttley, 35 Chestnut St., Kitchener,
Ontario, Canada
Filed June 22, 1962, Ser. No. 204,547
11 Claims. (Cl. 296—26)

This invention relates to a trailer of the type having wheels and adapted to be pulled by a truck or tractor or the like. More particularly, this invention relates to a telescopic trailer which is built in two sections, one of which may be telescoped within the other.

As is well known, there are many types of tractor-trailer combinations in use today. However, many of such trailers suffer from the disadvantage that they are of a fixed capacity.

Accordingly, it is one object of my invention to provide a telescopic trailer which has a first section and a second section, the second section being slidably mounted in the first section. Such an arrangement results in a trailer constructed so that in the telescoped or retracted position of the two sections, the overall length of the trailer is reduced to about one-half of its length when the sections are untelescoped, thus permitting easier manipulation of the trailer during transit and enabling one truck or power vehicle to transport a trailer which can be untelescoped to form a trailer which is twice the size of a normal trailer. Not only does such a construction eliminate the need for a second power vehicle, but when the trailer is not in use, permits two full-size trailer sections to be stored in the space normally required for one.

It is another object of my invention to provide a telescopic trailer constructed so that when the sections thereof are untelescoped, the floor space, the length and the volume of the trailer are roughly twice as great as the corresponding parameters of a single section of the trailer, thereby providing a trailer which in some instances can be used twice as effectively as a single trailer unit of the same size as one of the sections making up my telescopic trailer.

Another important object of my invention is to provide a telescopic trailer which is constructed in such a manner that there is no need to disturb "furnishings" housed within the trailer when the sections thereof are telescoped or untelescoped.

Yet an additional object of my invention is to provide a telescopic trailer which could be used, for example, as a schoolhouse, church, circus wagon, library, museum, hospital, mess hall, office, bunkhouse, laundry, fumigation or decontamination unit, quartermaster store, or for merchant displays or storage.

Another object of my invention is to provide a telescopic trailer which has hinged floor sections and/or hinged false ceiling sections.

Yet another object of my invention is to provide a telescopic trailer having a movable partition therein which may be used as a divider.

In brief, a telescopic trailer embodying my invention has a second section which is slidably mounted in a first section. The first section has two spaced-apart first side walls, a first roof joining the first side walls, an end wall at one end of the first section joining the first side walls and a first floor which is secured to the end wall and extends at least substantially the length of the first section. The first floor extends only part-way across the first section and terminates short of the first side walls. The second section has two spaced-apart second side walls, a second roof joining the second side walls, an end wall at one end of the second section joining the second side walls and a second floor extending at least substantially the length of the second section and joining the second side walls. The second section is slidably mounted in the first section with the end walls of the trailer at opposite ends thereof, the second roof being under the first roof, the second floor being under the first floor and the second side walls being inside the first side walls and extending through the spaces between the first floor and the first side walls when the first and second sections are telescoped.

My invention will become more apparent from the following detailed description taken in conjunction with the drawings in which:

FIGURE 1 is a side elevation of a telescopic trailer embodying my invention and showing the sections thereof untelescoped;

FIGURES 1a and 1b are sections through a telescopic trailer embodying my invention showing the roller means employed therein;

FIGURE 2 is a view similar to that shown in FIGURE 1 but showing the sections telescoped together;

Figure 4:
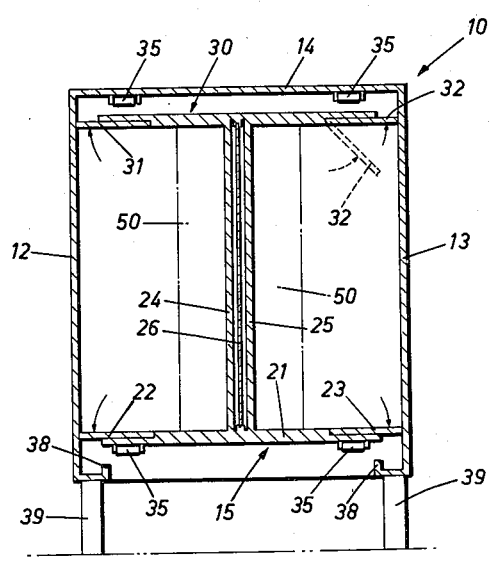
Figure 5:
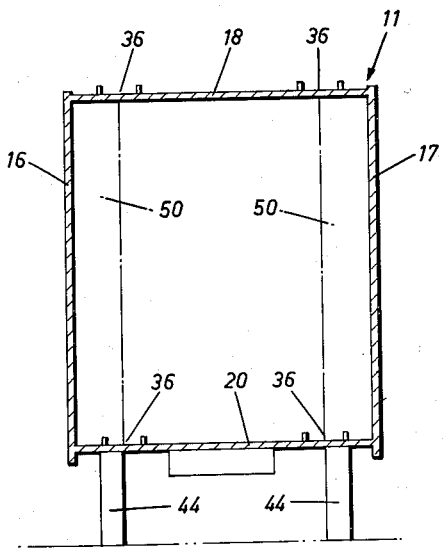

FIGURES 4 and 5 are sections taken along lines 4—4 and 5—5 respectively in FIGURE 1;

FIGURE 6 is a section taken through the side of a telescopic trailer embodying my invention and in the position shown in FIGURE 1; and FIGURE 7 is a section taken along line 7—7 in FIGURE 6.

Figure 3:
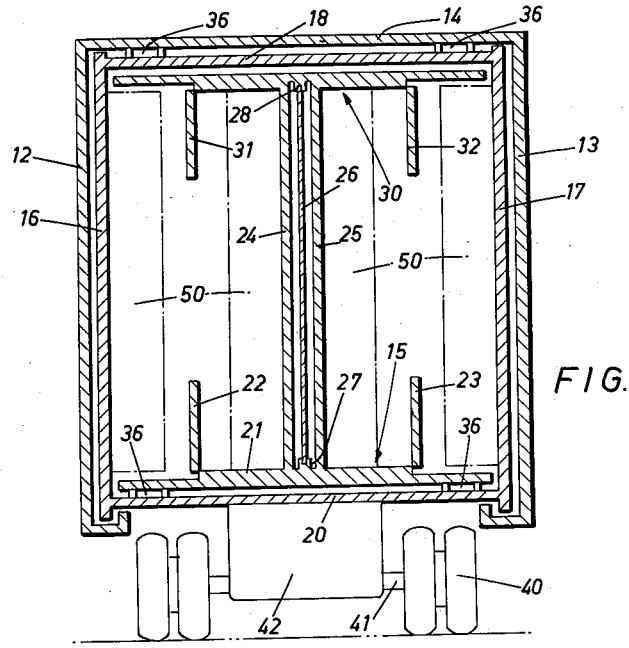
FIGURE 3 is a section taken along line 3—3 in FIGURE 2.

Turning now to the drawings, a telescopic trailer embodying my invention has an outer section 10 and an inner section 11, the inner section being slidably mounted in the outer section, as will be more apparent hereinafter. Outer section 10 has two spaced-apart side walls 12 and 13, a roof 14 which joins side walls 12 and 13, an end wall 14a which joins side walls 12 and 13 and a floor 15 which is secured to end wall 14 and extends at least substantially the length of outer section 10. As best seen in FIGURES 3, 4 and 7, floor 15 extends only part-way across outer section 10 and terminates short of side walls 12 and 13.

Inner section 11, as best seen in FIGURES 3 and 5, has two spaced-apart side walls 16 and 17, a roof 18 which joins side walls 16 and 17, an end wall 19 (FIGURES 1, 2, 6 and 7) at one end of inner section 11 and joining side walls 16 and 17 and a floor 20 which extends at least substantially the length of inner section 11. It will be noted that when inner section 11 is telescoped in outer section 10, end walls 14a and 19 are at opposite ends of the trailer, roof 18 is under roof 14, floor 20 is under floor 15 and side walls 16 and 17 are positioned inside of side walls 12 and 13 respectively and extend through the spaces between floor 15 and side walls 12 and 13.

Secured to floor 15 and forming a part thereof, is a floor section 21 which is of substantially the same length as floor 15. Floor sections 22 and 23 are hinged to floor 15 through floor section 21 and extend at least substantially the length of outer section 10, i.e. from end wall 14a to the point where side walls 12 and 13 and 16 and 17 overlap in the open position as shown in FIGURES 6 and 7. As best seen in FIGURES 3 and 4, floor sections 22 and 23 are movable from a position substantially parallel to side walls 12 and 13 (FIGURE 3) to occupy the spaces between floor 15 and side walls 12 and 13 when outer and inner sections 10 and 11 respectively are untelescoped, as is best seen in FIGURE 4. Any suitable means may be employed for raising and lowering hinged floor sections 22 and 23. These hinged floor sections may be manually actuated as by means of ropes and pulleys, or they may be electrically or hydraulically actuated. Furthermore, hinged floor sections 22 and 23 may be operated automatically to be moved to the position shown in FIGURE 4 when sections 10 and 11 are untelescoped and to be moved automatically to the position shown in FIGURE 3 when the outer and inner sections are telescoped.

As best seen in FIGURES 3 and 4, positioned between side walls 12 and 13 and side walls 16 and 17 are walls 24 and 25 which extend upwardly from floor section 21 and are secured thereto, these walls 24 and 25 terminating short of roof 18 and extending at least substantially the length of floor section 21. Housed between walls 24 and 25 is a slidable partition 26 which is slidable in tracks 27 and 28 (FIGURE 3). As best seen in FIGURE 7, partition 26 may be moved into inner section 11 between side walls 16 and 17 when sections 10 and 11 are untelescoped. Partition 26 and walls 24 and 25 divide outer and inner sections 10 and 11 into two aisles which join each other adjacent the end of inner section 11 remote from outer section 10 so that persons passing through the trailer can move through the trailer in a generally U-shaped path, the persons entering the trailer through an opening 29 in end wall 14a on one side or the other of walls 24 and 25 and leaving through the same opening 29 on the other side of walls 24 and 25.

A false ceiling 30 is supported by walls 24 and 25 and is positioned under roof 18. The false ceiling extends towards side walls 12 and 13 and terminates short of these side walls. When inner section 11 is telescoped in outer section 10, side walls 16 and 17 extend through the spaces between false ceiling 30 and side walls 12 and 13.

Two false ceiling sections 31 and 32 are hinged to false ceiling 30 and are movable from a position substantially parallel to side walls 12 and 13 (see FIGURE 3) to occupy the spaces between false ceiling 30 and side walls 12 and 13 when outer and inner sections 10 and 11 respectively are untelescoped. False ceiling sections 31 and 32 may be actuated in the same manner as hinged floor sections 22 and 23.

Referring now to FIGURES 1a, 1b, 4 and 5, it will be seen that I mount rollers 35 on roof 14 and floor 15, two sets of rollers being provided, one adjacent each side of the telescopic trailer, the rollers extending the complete length of outer section 10 as best seen in FIGURE 6. Rollers 35 roll in and are guided by tracks 36 which are provided on each side of the telescopic trailer and which are secured to floor 20 and roof 18 as best shown in FIGURES 3 and 5. As may be seen in FIGURE 1b, I also provide rollers 37 which are rotatably mounted on side walls 12 and 13 and the upwardly turned portions 38 thereof, these rollers 37 bearing against side walls 16 and 17.

As best seen in FIGURES 1 and 4, two retractable supports 39 are provided adjacent end wall 14a of outer section 10. Supports 39 are lowered into position and engagement with the ground prior to the untelescoping of sections 10 and 11 and support the rear portion of outer section 10. As best seen in FIGURES 1 and 2, wheels 40 on which the telescopic trailer is transported are mounted on an axle 41 (FIGURE 3) which is rotatably supported in a bearing 42 secured to floor 20, wheels 40 being positioned adjacent the rear end of inner section 11. As seen in FIGURE 1, wheels 40 form the central support of the whole telescopic trailer when sections 10 and 11 are untelescoped. The front end of the telescopic trailer may be supported by the tractor 43 which draws the telescopic trailer, or alternatively may be supported by retractable supports 44 of the same type as that shown at 39. When such supports 44 are employed, the tractor 43 may be uncoupled from inner section 11, leaving the tractor free for other use.

It should be noted that safety locks (not shown) which hold inner section 11, when telescoped, in outer section 10, are provided so as to preclude any possibility of sections 10 and 11 becoming untelescoped during transit of the telescopic trailer. When such safety locks are released, however, inner section 11 is free to be drawn forward by tractor 43 from the position shown in FIGURE 2 to that shown in FIGURE 1. It will be appreciated, of course, that in tractor 43 there will be provided a panel having signal lights which will indicate to the operator whether or not the safety locks are locked, if inner section 11 is being withdrawn from outer section 10 in a straight line, the distance left before inner section 11 is completely untelescoped from outer section 10, and when inner section 11 has reached the fully untelescoped position shown in FIGURE 1. It should be noted, and as best seen in FIGURE 6, that tongue and groove means 45 are provided on sections 10 and 11 between the side walls and roofs thereof, and when inner section 11 is completely untelescoped, the tongue and groove means 45 mesh with each other to weatherproof the joint between sections 10 and 11.

While not shown in the drawings, it should be noted that doors are provided in opening 29 in end wall 14a and retractable steps may be provided and can be lowered to ground level to permit access to outer section 10 through opening 29.

It is important to note that floor 15 of outer section 10, unlike side walls 12 and 13 and roof 14 thereof, is elevated to enter inside of inner section 11, i.e. above floor 20 so that "furnishings" can be mounted on floor 15, and such "furnishings" thereby do not have to be moved when sections 10 and 11 are telescoped or untelescoped. It will be seen from FIGURE 6 that in the untelescoped position of sections 10 and 11, floor 15 rests with its front end on the rear end of floor 20 of inner section 11, thereby forming a slight step between these floors.

The interiors of side walls 12 and 13 and both sides of partition 26 are capable of holding any permanently or temporarily fixed graphic means. Graphic means, as the term is used herein, are defined as charts, pictures, posters, blackboards, bulletin boards, mirrors, maps, charts and calendars.

"Furnishings" may be mounted on floor 15 between floor sections 22 and 23 and may be secured to walls 24 and 25, these "furnishings" being designated as 50. In addition, "furnishings" 50 may be secured to the interior of side walls 16 and 17 and end wall 19 as best shown in FIGURE 7. "Furnishings," as the term is used herein, are defined as display means, lighting equipment, heating equipment, air-conditioning equipment or refrigeration equipment. Display means, as the term is used herein, mean devices such as display cases, shelves, racks, cupboards or other means used for the display of articles. It should be noted, and as best seen in FIGURE 3, that "furnishings" 50 secured to side walls 16 and 17 cover tracks 36 secured to floor 20 when inner section 11 is untelescoped from outer section 10. As an alternative to employing display means secured to end wall 19, a shallow depth compartment suitable for use as a snack or beverage bar or chemistry laboratory may be provided adjacent end wall 19. This compartment may be concealed from view when not in use by hinged doors, and these doors may be utilized for the display of graphic means.

It will be seen that a telescopic trailer embodying my invention is especially suitable for use in connection with the display and promotion of the products produced by a company as such products may be displayed in display means 50, while pictures of the operations and products of the company may be mounted on both sides of partition 26 and on the interiors of side walls 12 and 13. Furthermore, it will be noted that with "furnishings" 50 placed as hereinbefore indicated, there is no necessity for any of the "furnishings" to be moved when sections 10 and 11 are telescoped or untelescoped.

While I have disclosed certain preferred embodiments of my invention, it will be apparent to those skilled in the art that changes and modifications may be made thereto without departing from the spirit and scope of my invention.

What I claim as my invention is:

1. A telescopic trailer having a second section slidably flanges having opposite projecting portions and shoulders at the opposite sides thereof, and each also having an abutment at the opposite side of at least one of said shoulders associated with each of said projecting portions, said projections and shoulders being in axial alignment; and a connecting member having opposite coupling portions provided with cut-out portions opening at each of the axially opposite ends thereof for axially receiving said projections associated with said knob-supporting sections, said coupling portions each having a pair of hooks at each cut-out portion disposed to embrace said flange, said connecting member also having a resilient portion extending between said coupling portions and normally biasing said coupling portions toward each other to generate a clamping action against said sections.

References Cited in the file of this patent

UNITED STATES PATENTS

| | | |
|---|---|---|
| 2,733,088 | Fisler et al. | Jan. 31, 1956 |
| 2,800,351 | Schmid | July 23, 1957 |
| 2,959,439 | Russell et al. | Nov. 8, 1960 |